(12) United States Patent
Lee et al.

(10) Patent No.: US 12,112,494 B2
(45) Date of Patent: Oct. 8, 2024

(54) ROBOTIC MANIPULATION USING DOMAIN-INVARIANT 3D REPRESENTATIONS PREDICTED FROM 2.5D VISION DATA

(71) Applicant: Google LLC, Mountain View, CA (US)

(72) Inventors: Honglak Lee, Mountain View, CA (US); Xinchen Yan, Cupertino, CA (US); Soeren Pirk, Palo Alto, CA (US); Yunfei Bai, Fremont, CA (US); Seyed Mohammad Khansari Zadeh, San Carlos, CA (US); Yuanzheng Gong, San Jose, CA (US); Jasmine Hsu, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 797 days.

(21) Appl. No.: 17/053,335

(22) PCT Filed: Feb. 28, 2020

(86) PCT No.: PCT/US2020/020424
§ 371 (c)(1),
(2) Date: Nov. 5, 2020

(87) PCT Pub. No.: WO2020/180697
PCT Pub. Date: Sep. 11, 2020

(65) Prior Publication Data
US 2021/0101286 A1  Apr. 8, 2021

Related U.S. Application Data

(60) Provisional application No. 62/812,892, filed on Mar. 1, 2019, provisional application No. 62/822,762, filed on Mar. 22, 2019.

(51) Int. Cl.
*G06T 7/55* (2017.01)
*B25J 9/16* (2006.01)
(Continued)

(52) U.S. Cl.
CPC ............... *G06T 7/55* (2017.01); *B25J 9/1605* (2013.01); *B25J 9/163* (2013.01); *B25J 9/1669* (2013.01);
(Continued)

(58) Field of Classification Search
CPC ... G06T 7/55; G06T 7/50; G06T 2207/10024; G06T 2207/10028; G06T 2207/20081;
(Continued)

(56) References Cited

U.S. PATENT DOCUMENTS

2016/0089782 A1   3/2016  Sisbot
2018/0126547 A1*  5/2018  Corkum ................ B25J 9/1664
(Continued)

FOREIGN PATENT DOCUMENTS

GB      2576322      2/2020
WO    2011146259    11/2011
(Continued)

OTHER PUBLICATIONS

Qi, C. et al. (2018). "Frustum PointNets for 3D Object Detection from RGB-D Data." In Proceedings of the IEEE Conference on Computer Vision and Pattern Recognition; pp. 918-927. 2018.
(Continued)

*Primary Examiner* — B M M Hannan
*Assistant Examiner* — Alyzia N Dilworth
(74) *Attorney, Agent, or Firm* — Gray Ice Higdon

(57) ABSTRACT

Implementations relate to training a point cloud prediction model that can be utilized to process a single-view two-and-a-half-dimensional (2.5D) observation of an object, to generate a domain-invariant three-dimensional (3D) represen-
(Continued)

tation of the object. Implementations additionally or alternatively relate to utilizing the domain-invariant 3D representation to train a robotic manipulation policy model using, as at least part of the input to the robotic manipulation policy model during training, the domain-invariant 3D representations of simulated objects to be manipulated. Implementations additionally or alternatively relate to utilizing the trained robotic manipulation policy model in control of a robot based on output generated by processing generated domain-invariant 3D representations utilizing the robotic manipulation policy model.

18 Claims, 7 Drawing Sheets

(51) Int. Cl.
    B25J 13/08       (2006.01)
    G06F 18/21       (2023.01)
    G06T 7/50        (2017.01)
    G06V 20/10       (2022.01)
    G06V 20/64       (2022.01)

(52) U.S. Cl.
    CPC .......... *B25J 9/1697* (2013.01); *B25J 13/08* (2013.01); *G06F 18/2163* (2023.01); *G06T 7/50* (2017.01); *G06V 20/10* (2022.01); *G06V 20/64* (2022.01); *G06T 2207/10024* (2013.01); *G06T 2207/10028* (2013.01); *G06T 2207/20081* (2013.01); *G06T 2207/20084* (2013.01); *G06T 2207/20132* (2013.01)

(58) Field of Classification Search
    CPC .. G06T 2207/20084; G06T 2207/20132; B25J 9/1605; B25J 9/163; B25J 9/1669; B25J 9/1697; B25J 13/08; B25J 9/1671; G06F 18/2163; G06V 20/10; G06V 20/64
    See application file for complete search history.

(56) References Cited

U.S. PATENT DOCUMENTS

| 2019/0354813 A1* | 11/2019 | Riedmiller | G06N 3/088 |
| 2020/0164505 A1* | 5/2020 | Boer | G06T 7/70 |
| 2021/0166426 A1* | 6/2021 | McCormac | G06T 7/579 |

FOREIGN PATENT DOCUMENTS

| WO | 2017201023 | 11/2017 |
| WO | 2018142212 | 8/2018 |
| WO | 2018236753 | 12/2018 |

OTHER PUBLICATIONS

Yan, X. et al., "Data-Efficient Learning for Sim-to-Real Robotic Grasping Using Deep Point Cloud Prediction Networks;" Cornell University; arXiv.org; arXiv:1906.08989v1; 10 pages; Jun. 21, 2019 Jun. 21, 2019.
Chen, Z. et al., "Object Detection for UAV Grasping: Solution and Analysis;" 2018 IEEE International Conference on Information and Automation (ICIA); pp. 1078-1083; Aug. 11, 2018 Aug. 11, 2018.
Fan, H. et al., "A Point Set Generation Network for 3D Object Reconstruction from a Single Image;" Cornell University; arXiv. org; arXiv:1612.00603v1; 12 pages; Dec. 2, 2016 Dec. 2, 2016.
Chu, P. et al., "Generative Adversarial Network-Based Method for Transforming Single RGB Image Into 3D Point Cloud;" IEEE Access, vol. 7, pp. 1021-1029; Jan. 4, 2019 Jan. 4, 2019.
Satish, V. et al., "On-Policy Dataset Synthesis for Learning Robot Grasping Policies Using Fully Convolutional Deep Networks;" IEEE Robotics and Automation Letters, vol. 4, No. 2; 8 pages; Feb. 15, 2019 Feb. 15, 2019.
European Patent Office; Invitation to Pay Additional Fees, PCT Ser. No. PCT/US2020/020424; 10 pages; May 19, 2020 May 19, 2020.
European Patent Office; International Search Report and Written Opinion of PCT Ser. No. PCT/US2020/020424; 15 pages; dated Jul. 10, 2020 Jul. 10, 2020.
European Patent Office; Communication pursuant to Article 94(3) EPC issued in Application No. 20716130.8; 8 pages; dated Feb. 28, 2023.
China Patent Office; Notice of First Office Action issued in Application No. 202080004276.0; 20 pages; dated May 28, 2024.

* cited by examiner

ROBOTIC MANIPULATION USING DOMAIN-INVARIANT 3D REPRESENTATIONS PREDICTED FROM 2.5D VISION DATA

BACKGROUND

Various machine learning based approaches to robotic control have been proposed. Some of those approaches train a machine learning model (e.g., a deep neural network model) that can be utilized to generate one or more predictions that are utilized in control of a robot, and train the machine learning model using training data that is based only on data from real-world physical robots. However, these and/or other approaches can have one or more drawbacks. For example, generating training data based on data from real-world physical robots requires heavy usage of one or more physical robots in generating data for the training data. This can be time-consuming (e.g., actually navigating a large quantity of paths requires a large quantity of time), can consume a large amount of resources (e.g., power required to operate the robots), can cause wear and tear to the robots being utilized, and/or can require a great deal of human intervention.

In view of these and/or other considerations, use of robotic simulators has been proposed to generate simulated robot data that can be utilized in generating simulated training data that can be utilized in training of the machine learning models. However, there is often a meaningful "reality gap" that exists between real robots and real environments—and the simulated robots and/or simulated environments simulated by a robotic simulator. This can result in generation of simulated training data that do not accurately reflect what would occur in a real environment. This can affect performance of machine learning models trained on such simulated training data and/or can require a significant amount of real world training data to also be utilized in training to help mitigate the reality gap.

SUMMARY

Implementations disclosed herein relate to training a point cloud prediction model (a machine learning model such as a neural network model) that can be utilized to process a single-view two-and-a-half-dimensional (2.5D) observation of the object, to generate a domain-invariant three-dimensional (3D) representation of the object (e.g., a 3D point cloud of the object). Various implementations further relate to utilizing the domain-invariant 3D representation to train (e.g., at least in part in simulation) a robotic manipulation policy model (e.g., a critic network or other policy model) using, as at least part of the input to the robotic manipulation policy model during training, the domain-invariant 3D representations of simulated objects to be manipulated. Various implementations additionally or alternatively relate to utilizing the trained robotic manipulation policy model in control of a robot based on output generated by processing generated domain-invariant 3D representations utilizing the robotic manipulation policy model.

The domain-invariant 3D representations are generated based on processing, using the trained shape prediction network (e.g., a point cloud prediction network or other 3D shape prediction network), 2.5D observations captured by a camera of the robot. The 2.5D observations can be images that include one or more color channels (e.g., red, green, and blue channels) and a depth channel. In other words, each pixel of the images can have a depth channel and one or more color channels. The camera can be, for example, a RGB-D camera that includes one or more sensors that capture vision data that collectively (and optionally after processing) defines an image having a plurality of pixels and, for each of the pixels, a depth channel and one or more additional channels (e.g., red, green, and blue channels). Various types of RGB-D cameras can be utilized, including passive RGB-D cameras and active RGB-D cameras (e.g., that include a speckle projector, or that utilize a light source and time-of-flight). As described herein, each 2.5D image utilized in generating a domain-invariant 3D representation can be a single view 2.5D image.

Various efficiencies can be achieved by training the shape prediction model and/or the robotic manipulation policy utilizing simulated data. For example, ground truth data utilized in training one or both models can be efficiently obtained from simulation. Also, utilization of the domain-invariant 3D representation as input to the robotic manipulation policy model can enable the network to be trained based primarily (or solely) on simulated training data, while mitigating the reality gap when the robotic manipulation policy model is utilized on real world robots. For example, a domain-invariant 3D representation that is a 3D point cloud of the object describes the 3D shape of the object, which can have minimal/no reality gap when simulated. Such 3D point cloud is invariant to texture or environmental changes, which can have significant reality gap when simulated. Further, the domain-invariant 3D representation can be compact (data-wise), while being semantically interpretable and directly applicable for object manipulation. This can enable efficient processing of such representation using a robotic manipulation policy model, while achieving high accuracy and/or robustness.

Further, the domain-invariant 3D representation can be efficiently transformed between frames, such as a frame of the camera that captured the 2.5D observation (used to generate the 3D representation) to a frame of a robotic end effector. As described herein, the robotic manipulation policy can optionally be trained to process a transformed domain-invariant 3D representation (and optionally only the transformed representations) in generating a probability (or other value) of the corresponding robotic end effector pose (that used in generating the transformed domain-invariant 3D representation) leading to a successful manipulation (e.g., grasp). Since the domain-invariant 3D representation is compact (data-wise), such processing can be computationally efficient and/or model(s) (e.g., neural network model(s)) representing the policy can be compact (data-wise). For example, processing the domain-invariant 3D representation can be more efficient than processing full RGB image(s). Also, for example, processing the transformed domain-invariant 3D representation, without also processing the end effector pose used to generate the transformed domain-invariant 3D representation, can be more efficient that processing bot the domain-invariant 3D representation and the end effector pose. Yet further, the texture and environmental invariance of the domain-invariant 3D representation enables it to be effectively applied to the robotic manipulation policy model for variously textured object and/or various environments.

The domain-invariant 3D representation of the object can be a full 3D point cloud of the object. The shape prediction model can be trained utilizing a large quantity of simulated training data, and a small quantity (or no) quantity of real world training data. For example, 50,000 or more (e.g., 60,000, 70,000) episodes in simulation can be utilized, while less than a thousand (e.g., less than 600, less than 500)

episodes in the real world can be utilized. The 2.5D observation of the object, that is processed to generate the domain-invariant 3D representation, can be an RGB-D (where D is depth) image. In various implementations, an additional object mask channel (in addition to the RGB-D channels) can also be utilized as input to the shape prediction model to, for example, enable handling of situations where multiple objects are present in the 2.5D observation of the object. The mask can be generated based on processing the 2.5D observation of the object (e.g., at least the 2D portion thereof) utilizing an object detection network such as a Mask-RCNN network. For example, assume a target object is an apple and a 2.5D image includes the apple and a banana. The object detection network can be utilized to determine pixels of the 2.5D image that correspond to the apple, and the additional mask generated as an additional channel where those pixels in the channel have a value indicating the target object is present in the corresponding pixels.

In some implementations, the robotic manipulation policy model is a critic prediction network that can be utilized to generate, based on the domain-invariant 3D representation and a candidate end effector pose, a manipulation outcome prediction for the candidate end effector pose. For example, where the manipulation is grasping, a critic grasp prediction network can be utilized to predict, based on a candidate grasp pose (of an end effector) and a domain-invariant 3D representation of an object, a probability that the candidate grasp pose will be successful. For instance, a domain-invariant 3D representation that is a 3D point cloud can be transformed to a frame relative to the candidate grasp pose. The transformed 3D point cloud can then be processed using the critic grasp prediction network to generate the probability that the candidate grasp pose will be successful. Various candidate grasp poses can be considered utilizing the critic grasp prediction network, and a highest probability candidate grasp pose selected for attempting a grasp. In other implementations, the robotic manipulation policy model can be utilized for other robotic tasks such as, for example, pushing an object, pulling an object, etc. In some implementations, a non-transformed domain-invariant 3D representation and a candidate end effector pose can processed using a robotic manipulation policy to generate a manipulation outcome prediction. Put another way, in those implementations both the non-transformed domain-invariant 3D representation and the candidate end effector pose can be applied as input, instead of the transformed domain-invariant 3D representation. Also, in some implementations the robotic manipulation policy can include an action prediction network, instead of or in addition to a critic prediction network. For example, the action prediction network can be used to process the non-transformed domain-invariant 3D representation to generate output that indicates an action prediction for a robotic task. For instance, the output can indicate (directly or indirectly) an end effector pose.

As mentioned above, in various implementations the domain-invariant 3D representation can optionally be transformed to the frame of an end effector pose being considered. For example, an initial domain-invariant 3D representation can be generated by processing a 2.5D image (and optionally a mask) using a trained shape prediction model. The initial domain-invariant 3D representation can then be transformed to the frame of a candidate end effector pose. The transformed domain-invariant 3D representation can then be processed using the robotic manipulation policy model to, for example, generate a prediction of success of manipulation utilizing the candidate end effector pose.

Accordingly, in those various implementations the transformed domain-invariant 3D representation can be processed using the robotic manipulation policy without directly processing the candidate end effector pose using the robotic manipulation policy. Rather, the candidate end effector pose is reflected by the transformed domain-invariant 3D representation, which is transformed to the frame of the candidate end effector pose. Implementations that use the transformed domain-invariant 3D representation, instead of a non-transformed initial domain-invariant 3D representation and separate representation of the candidate end effector pose, can be trained more efficiently and/or can be more robust and/or accurate during inference.

The above description is provided as an overview of some implementations of the present disclosure. Further description of those implementations, and other implementations, are described in more detail below.

BRIEF DESCRIPTION OF THE DRAWINGS

FIG. 2 further illustrates an example of using the predicted 3D point cloud in controlling a robot.

DETAILED DESCRIPTION

Figure 1:
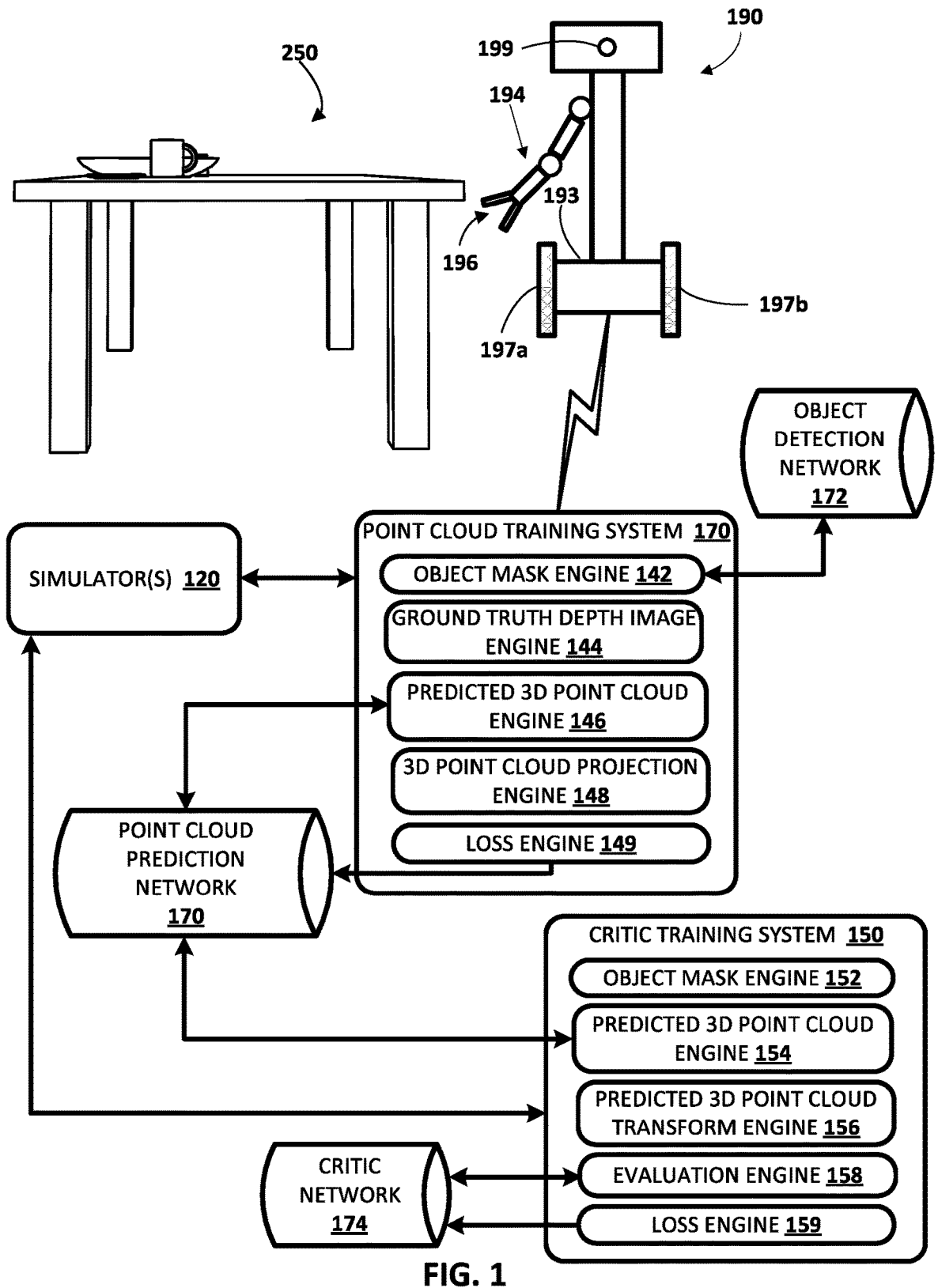
FIG. 1 illustrates an example environment in which implementations disclosed herein can be implemented.

Some implementations disclosed herein relate to training a point cloud prediction network (a machine learning model such as a neural network model) that can be utilized to process a single-view two-and-a-half-dimensional (2.5D) observation of the object, to generate a domain-invariant three-dimensional (3D) representation of the object (e.g., a 3D point cloud of the object). In some of those implementations, self-supervision is utilized in training the point cloud prediction network. Some implementations additionally or alternatively relate to utilizing the domain-invariant 3D representation to train a robotic manipulation policy model (e.g., a critic network) using, as at least part of the input to the robotic manipulation policy model during training, the domain-invariant 3D representations of objects to be manipulated. Various implementations additionally or alternatively relate to utilizing the trained robotic manipulation policy model in control of a robot based on output generated by processing generated domain-invariant 3D representations utilizing the trained robotic manipulation policy model.

A 3D point cloud of an object, that is generated by processing a 2.5D observation of an object utilizing a point cloud prediction network, can be domain-invariant, semantically interpretable, and directly applicable for object manipulation (e.g., grasping, pushing, placing, and/or other manipulation(s). The generated 3D point cloud can be lightweight and flexible as compared to other 3D representations such as voxel grids and triangle meshes. This can result in utilization of less resources (e.g., memory resources) when the 3D point cloud is processed using a trained robotic manipulation policy in controlling a robot. Further, the generated 3D point cloud can describe the full 3D shape of the object, which is invariant to surface textures or environmental conditions. This can mitigate the reality gap when the generated 3D point clouds are used in training a critic network, and the generated 3D point clouds and the supervision signals used in training the policy network are based at least in part on simulated data. As used herein, the "reality gap" is a difference that exists between real robots and/or real environments—and simulated robots and/or simulated environments simulated by a robotic simulator. Yet further, the generated 3D point cloud can directly be used to localize objects in the scene, hence simplifying the task(s) when training a critic network or other policy network.

Prior to turning to the figures, some particular non-limiting examples are provided of training a point cloud prediction network and of training a policy network that is a grasping critic network. As one particular example of training a point cloud prediction network, assume a set of RGB-D observations $\{O_1, O_2, \ldots, O_N\}$, where $O_n \in \mathbb{R}^{h \times w \times 4}$ is an individual simulated or real world observation that captures a target object. The goal can be to learn a domain-invariant point cloud representation $O_n$ that reflects the 3D geometry of the target object. N RGB-D images can be obtained by using a mobile manipulator moving around and taking snapshots of various workspaces from different angles (which, in the simulated world, is achieved by altering the vantage of a simulated observation). The depth values from the RGB-D observations forms a 2.5D representation of the objects (e.g., visible part subject to noise) and thus do not provide the full 3D geometry. Further, there is a reality gap between the depth values in simulation and real world, hence making a policy that is solely trained in simulation quite ineffective in the real world.

Continuing with the particular example, self-supervised labeling of the observations can occur. While target point clouds for supervised learning of a deep network can be easily obtained in simulation, this task becomes notoriously costly (e.g., computer resource wise) and time-consuming for real world data. Further, the presence of noise and un-modeled nonlinear characteristics in a real world depth sensor make the learning harder, especially in the context of transfer learning. To address this challenge, implementations disclosed herein generate self-supervised labels using view-based supervision with differential re-projection operators.

As an example, a point cloud $\mathcal{P}$ of an object $O$ can be represented as a set of K points $\mathcal{P} = \{p_k = (x_k, y_k, z_k) | 1 \leq k \leq K\}$, where $x_k, y_k, z_k$ are coordinates regarding k-th point $p_k$ along xyz axis, respectively. Without loss of generality, the point cloud coordinates can be assumed to be defined in the camera frame. Further, the ground-truth point cloud annotation can be assumed to not be directly available in the real world data and, thus, multi-view projections can be used as the supervision signal (e.g., both for real world and for simulated data). For example, the camera intrinsic matrix E can be used to obtain the 2D projection $\mathcal{M}$ in the image space from the point cloud $\mathcal{P}$ (e.g., homogeneous coordinate $(u_k, v_k, 1)$ is projected from $(x_k, y_k, z_k)$:

$$(u_k, v_k, 1)^T \sim E(x_k, y_k, z_k)^T \tag{1a}$$

$$\mathcal{M} = \{(u_k, v_k)\}_{k=1}^{K} \tag{1b}$$

For localization, the corresponding tight bounding box can be derived from the 2D projection: $B = (u^{mid}, v^{mid}, w, h)$, where $u^{mid}, v^{mid}, w, h$ represents the bounding box center and size, respectively. N RGB-D images/snapshots can be collected from various scenes in simulation and real world by moving a mobile manipulator around the workspace. For the real world dataset, Mask-RCNN or other object detection network can be used to detect object bounding boxes $B^n$ and their associated mask at each frame. For the simulation dataset, bounding boxes and their associated mask can be directly obtained. Note that multiple objects may be present in many of the snapshots. The data associated to the m-th object in the n-th frame can be denoted by $(.)^{m,n}$. The number of objects in the n-th frame can be denoted by $C_n$. The mask for each object can be used to extract its associated depth values from the depth channel in each observation, and the camera intrinsic matrix $E^n$ used to obtain $\mathcal{M}^{m,n}$ from the depth values. This enables determination of $\mathcal{M}^{m,n}$ and $B^{m,n}$ for all $1 \leq n \leq N$ and $1 \leq m \leq \mathcal{M}^n$.

The point cloud prediction network can be used to generate a predicted point cloud $\hat{\mathcal{P}}$ which, in turn, can be used to determine $\hat{\mathcal{M}}^{m,n}$ and $\hat{B}^{m,n}$ using equations (1a) and (1b) (above). The loss function for training the point cloud prediction network can be defined as:

$$\mathcal{L}_\theta = \Sigma_{n=1}^{N} \Sigma_{m=1}^{Mn} (\lambda^B \mathcal{L}_\theta^B (\hat{B}^{m,n} B^{mn}) + \lambda_M \mathcal{L}_\theta^M (\hat{\mathcal{M}}^{m,n}, \mathcal{M}^{m,n})) + \lambda^\theta \|\theta\| \tag{2}$$

where $\lambda^B, \lambda^M, \lambda^\theta$ are weighting coefficients, $\mathcal{L}_\theta^B$ is the Huber loss between the estimated and labeled bounding box, and $\mathcal{L}_\theta^M$ is the projected point-cloud prediction loss.

In some implementations, the point cloud prediction network can include several encoder-decoder modules and a fully-connected layer to predict the point clouds. In some implementations, the input channels to the point cloud prediction network can include color channel(s) (e.g., R, G, and B), a depth channel, and an object mask channel. Further, the input channels can optionally be a dynamic crop of the base image (e.g., based on object detection), that is focused on the target object. Yet further, to account for the dynamic cropping, an additional input can optionally be provided as side input downstream from the initial inputs. For example, the additional input can be provided right after the initial encoder to provide the point cloud prediction network with the adapted camera intrinsic characteristic resulted from cropping. The additional input can be one or more camera intrinsics that define one or more intrinsic parameters of the camera that take into account the crop of the image.

A particular example is now provided of utilizing predicted 3D point clouds in training a policy network that is a grasping policy network. The grasping policy network can be a critic network represented by $\mathcal{G}(\mathcal{P}, s, \mathcal{T}_R^C)$ and can be used to predict the probability of the success for a sample grasp, $s \in \mathbb{R}^4$ of a target object based on the predicted point cloud $\mathcal{P}$, and the transformation from the robot base to the camera frame. The sample grasp $s = (p, \psi)$ can be a candidate end effector pose and can be composed of the 3D gripper position p with respect to the robot base and the gripper yaw rotation ψ.

The predicted point cloud $\mathcal{P}$ can be first transformed to the proposed grasp frame, thereby generating a transformed predicted point cloud. In some implementations, the transformation can be performed using $\mathcal{P}_s = \mathcal{T}_s^R \mathcal{T}_R^C \mathcal{P}$ (3), where $\mathcal{T}_s^R$ can be directly calculated based on the sample grasp pose s. Optionally, the order of points in $\mathcal{T}_s^R$ can be shuffled to allow the critic network to adapt to variations in the order of point clouds. In some implementations, the critic network can include multiple fully-connected layers each followed by a ReLU activation function with BatchNorm. The last layer of the critic network can optionally be linear and reduces the output size to one. It can be followed by a sigmoid activation function to provide the grasp success (e.g., a probability measure from 0 to 1).

In various implementations, a majority, a vast majority (e.g., 90% or more), or all of the training data for training the grasp policy can be generated in simulation. As one example, a heuristic grasping policy for the data collection in simulation can include: (1) compute the center of volume of the target object, $c_O$, based on the predicted point cloud; (2) set the translation part of the grasp pose to $c_O$ plus some random noise $\varepsilon \in R^3$, i.e. $x = c_O + \varepsilon$ (3); and (3) randomly draw a yaw angle from a uniform distribution in the range $[-\pi/2, \pi/2]$. The grasp success can then be evaluated by moving the simulated end effector to a pre-grasp pose s*, where s* is a pose offset (e.g., above) from s with some height difference constant, i.e. s*−s=(0,0, δh, 0). This pre-grasp pose s* enables aligning the simulated robot end-effector with respect to the simulated object before attempting the simulated grasp. Then the simulated robot is moved to pose s, and the simulated robot is commanded to attempt the grasp (e.g., close its parallel-jaw gripper when the end effector is a parallel-jaw gripper). The simulated robot is then commanded to lift the object (e.g., by moving back to s*). Then the grasp success is evaluated by checking whether the simulated object is moved above its original pose. This evaluation can be done easily in simulation since there is access to the ground truth object pose in simulation. The training data can be collected by running simulation robots in parallel and stored for training the off-policy grasping network.

Turning now to the figures, FIG. 1 illustrates an example environment in which implementations disclosed herein can be implemented. FIG. 1 includes a point cloud training system 140, which is implemented by one or more computer systems. The point cloud training system 140 interfaces with one or more simulators 120, one or more robots (e.g., robot 190), and/or one or more human-held cameras in obtaining RGB-D images for various environments with various objects. For example, robot 190 can navigate partially or all the way around table 250, while directing its vision component 199 (e.g., RGB-D camera) toward the table 250, to generate RGB-D images from the vision component 199. Other camera trajectories can likewise be captured with different environments, different objects and/or object arrangements, and optionally using different vision components. RGB-D images can additionally or alternatively be generated using simulator 120, with simulated environments and objects. Moreover, RGB-D images from human-held vision components can additionally or alternatively be utilized.

The point cloud training system 140 utilizes the RGB-D images to generate self-supervised training data and trains the point cloud prediction network 170 based on such training data. In various implementations, the point cloud training system 140 can perform one or more (e.g., all) aspects of method 300 of FIGS. 3A and 3B.

The point cloud training system 140 is illustrated in FIG. 1 as including an object mask engine 142, a ground truth depth engine 144, a predicted 3D point cloud engine 146, a 3D point cloud projection engine 148, and a loss engine 149. In other implementations, fewer or more engines can be provided, and/or one or more aspects of one or more engines can be combined. Implementations of the illustrated engines are now described with reference to generating an instance of training data, and training based on such instance. However, it is noted that training of the point cloud prediction network will be based on thousands of instances of training data and that batch training techniques can optionally be utilized.

In generating an instance of self-supervised training data based on an RGB-D image (e.g., a rendered image from simulation, or a real world image), the object mask engine 142 generates an object mask of an object captured in the RGB-D image. For example, where the RGB-D image is a real world image, the object mask engine 142 can use an object detection network 172 to detect object bounding box(es) for object(s) in the RGB-D image as well as an associated mask for each of the object(s). For instance, the object detection network 172 can be a mask-RCNN network or other trained network. Also, for example, where the RGB-D image is a simulated image, bounding box(es) as well as associated mask(s) can be directly obtained from the simulation data. Where multiple objects are captured in the RGB-D image, one of the objects can be selected for use in generating the instance of self-supervised training data. Optionally, other of the multiple objects in the RGB-D image can each be used in generating a corresponding additional instance of self-supervised training data. Put another way, multiple training instances can be generated based on an RGB-D image that includes multiple objects, with each of the instances being for a corresponding single one of the objects.

In generating the instance of self-supervised training data based on the RGB-D image, the ground truth depth engine 144 can generate a ground truth depth image based on the object mask and the depth channel of the RGB-D image. For example, the ground truth depth engine 144 can generate the depth image to include, for those pixels in the object mask (generated by object mask engine 142) that represent the object, the depth values, from the depth channel, that corresponds to those pixels. The other pixels of the ground truth depth image can be zero or other null value. Optionally, the ground truth depth image can be restricted to those pixels that are included in the bounding box determined by object mask engine 142 and/or can include (e.g., in an extra channel) the bounding box determined by object mask engine 142.

The instance of self-supervised training data can include training instance input of the RGB-D image (or at least a crop that includes those pixels included in the generated bounding box), the object mask, and optionally camera intrinsics that take into account the crop of the RGB-D image. The instance of self-supervised training data can include training instance output of the ground truth depth image.

The predicted 3D point cloud engine 146 can process the training instance input using the point cloud prediction network 170 to generate a predicted 3D point cloud of the object. For example, the predicted 3D point cloud engine 146 can apply the RGB-D image (or at least the crop) and the object mask to initial layer(s) of the point cloud prediction network 170, and apply the camera intrinsics as side input downstream from the initial layer(s) (e.g., following initial encoding layer(s)). The predicted 3D point cloud engine 146 can generate the predicted 3D point cloud using the point cloud prediction network 170, based on the applied input and using current weights of the point cloud prediction network 170.

The 3D point cloud projection engine 148 generates a projection of the predicted 3D point cloud generated by the predicted 3D point cloud engine 146. The generated projection can be a predicted depth image for the simulated object and can be generated based on the predicted 3D point cloud. For example, the 3D point cloud projection engine 148 can generate the projection using the camera intrinsics to obtain a 2D projection in the image space from the point cloud. For instance, equations (1a) and (1b) (above) can be utilized. The 3D point cloud projection engine 148 can also optionally generate a bounding box that can be derived from the 2D projection.

The loss engine 149 generates a loss based at least in part on comparison of the projection of the predicted 3D point cloud (generated by engine 148) and the ground truth depth image (generated by engine 144). The loss engine 149 can further generate the loss based on comparison of the ground truth bounding box optionally generated by engine 144 and the predicted bounding box optionally generated by engine 148. As one example, the loss engine 149 can generate the loss based on equation (2) (above). It is noted that, in various implementations, the loss engine 149 can generate a batch loss that is based on multiple instances of training data in a batch. The loss engine 149 then updates one or more weights of the point cloud prediction network 170 based on the generated loss. For example, the loss engine 149 can back-propagate the loss to update the weights of the point cloud prediction network 170.

Once the point cloud prediction network 170 is trained, it can be utilized by a real world robot (e.g., robot 190) in generating predicted 3D point clouds based on RGB-D images captured by the robot. Further, the predicted 3D point clouds can be utilized, by the robot, in controlling one or more of its actuators. In some implementations, the trained point cloud prediction network 170 is utilized in training a critic network or other robotic policy network, to process predicted 3D point clouds (generated using the trained point cloud prediction network 170) to generate corresponding output that is utilized in control of the robot. One non-limiting example of such training is now described with respect to critic training system 150 of FIG. 1, which is implemented by one or more computer systems.

The critic training system 150 interfaces with the trained point cloud prediction network 170, one or more simulators 120, and optionally one or more robots (e.g., robot 190) in training a critic network 174. In various implementations, the critic training system 150 can perform one or more (e.g., all) aspects of method 400 of FIG. 4.

The critic training system 150 is illustrated in FIG. 1 as including an object mask engine 152, a predicted 3D point cloud engine 154, predicted 3D point cloud transform engine 156, and a loss engine 159. In other implementations, fewer or more engines can be provided, and/or one or more aspects of one or more engines can be combined. Implementations of the illustrated engines are now described with reference to generating an instance of training data, and training based on such instance. However, it is noted that training of the critic network 174 network will be based on thousands of instances of training data and that batch training techniques can optionally be utilized.

In generating an instance of training data, a simulated RGB-D image can be rendered using the simulator 120 that simulates an environment, object(s), and a robot. The RGB-D image can capture at least one of the object(s) in the simulated environment. The object mask engine 152 can generate a mask of the target object using techniques such as those described with respect to object mask engine 142 (of point cloud training system 140). When the RGB-D image is a rendered simulated image, the mask can be generated using data from the simulator 120 or optionally, utilizing the object detection network 172. When it is a real world image, the object mask engine 152 can optionally utilize the object detection network 172 in generating the object mask. The object mask engine 152 can also optionally generate a bounding box for the object.

In generating the instance of training data, the predicted 3D point cloud engine 154 can process the RGB-D image (or at least the crop based on a bounding box generated by object mask engine 152) and the object mask to initial layer(s) of the point cloud prediction network 170, and can optionally apply camera intrinsics (of the camera that captured the RGB-D image) as side input downstream from the initial layer(s) (e.g., following initial encoding layer(s)). The predicted 3D point cloud engine 146 can generate the predicted 3D point cloud using the point cloud prediction network 170, based on the applied input and using the trained weights of the point cloud prediction network 170.

The predicted 3D point cloud transform engine 156 can generate a transformation of the predicted 3D point cloud using an end effector pose to be used for a manipulation attempt of the training instance. Put another way, the predicted 3D point cloud transform engine 156 can transform the 3D point cloud to an end effector frame that is relative to the end effector pose to be used for the manipulation attempt. For example, the 3D point cloud transform engine 156 can generate the transformation using equation (3) (above) and the end effector pose.

The evaluation engine 158 can process the transformation of the predicted 3D point cloud using the critic network, to generate a prediction of successful manipulation. The manipulation can then be attempted, e.g. by a simulated robot of simulator 120, using the end effector pose. It can then be determined, using data from the simulator 120, whether the manipulation was successful, and a ground truth measure of successful manipulation determined based on the determination (e.g., "1" if successful, "0" if unsuccessful). The loss engine 159 can then generate a loss based on comparing the prediction of successful manipulation to the ground truth measure of successful manipulation. The loss engine 159 then updates one or more weights of the critic network 174 based on the generated loss. For example, the loss engine 159 can back-propagate the loss to update the weights of the critic network 174.

Example robot 190 is illustrated in FIG. 1 as one example of a robot that can utilize point cloud prediction network 170 and/or critic network 174, when trained, in performance of various robotic tasks. Robot 190 is also one example of a robot that can be utilized to generate data for training of point cloud prediction network 170 and/or critic network 174.

The robot 190 includes robot arm 194 with a grasping end effector 196, that takes the form of a gripper with two opposing actuable members. The robot 190 also includes a base 193 with wheels 197*a* and 197*b* provided on opposed sides thereof for locomotion of the robot 190. The base 193 may include, for example, one or more motors for driving corresponding wheels 197*a* and 197*b* to achieve a desired direction, velocity, and/or acceleration of movement for the robot 190.

The robot 190 also includes a vision component 199. Vision component 199 generates images related to shape, color, depth, and/or other features of object(s) that are in the line of sight of its sensor(s). The vision component 199 can be, for example, a passive or active stereographic camera generating RGB-D images described herein. Although a particular robot 190 is illustrated in FIG. 1, additional and/or alternative robots may be utilized, including additional robot arms that are similar to robot 190, robots having robot arm forms, robots having a humanoid form, robots having an animal form, other robots that move via one or more wheels, an unmanned aerial vehicle ("UAV"), and so forth. Also, although a particular end effector is illustrated in FIG. 1, additional and/or alternative end effectors may be utilized to interact with objects.

The simulator(s) 120 are implemented by one or more computer systems, and can be used to simulate various environments that include corresponding environmental objects and corresponding placement location(s). Various simulators can be utilized, such as physics engines that simulate collision detection, soft and rigid body dynamics, etc. One non-limiting example of such a simulator is the BULLET physics engine.

Figure 2:
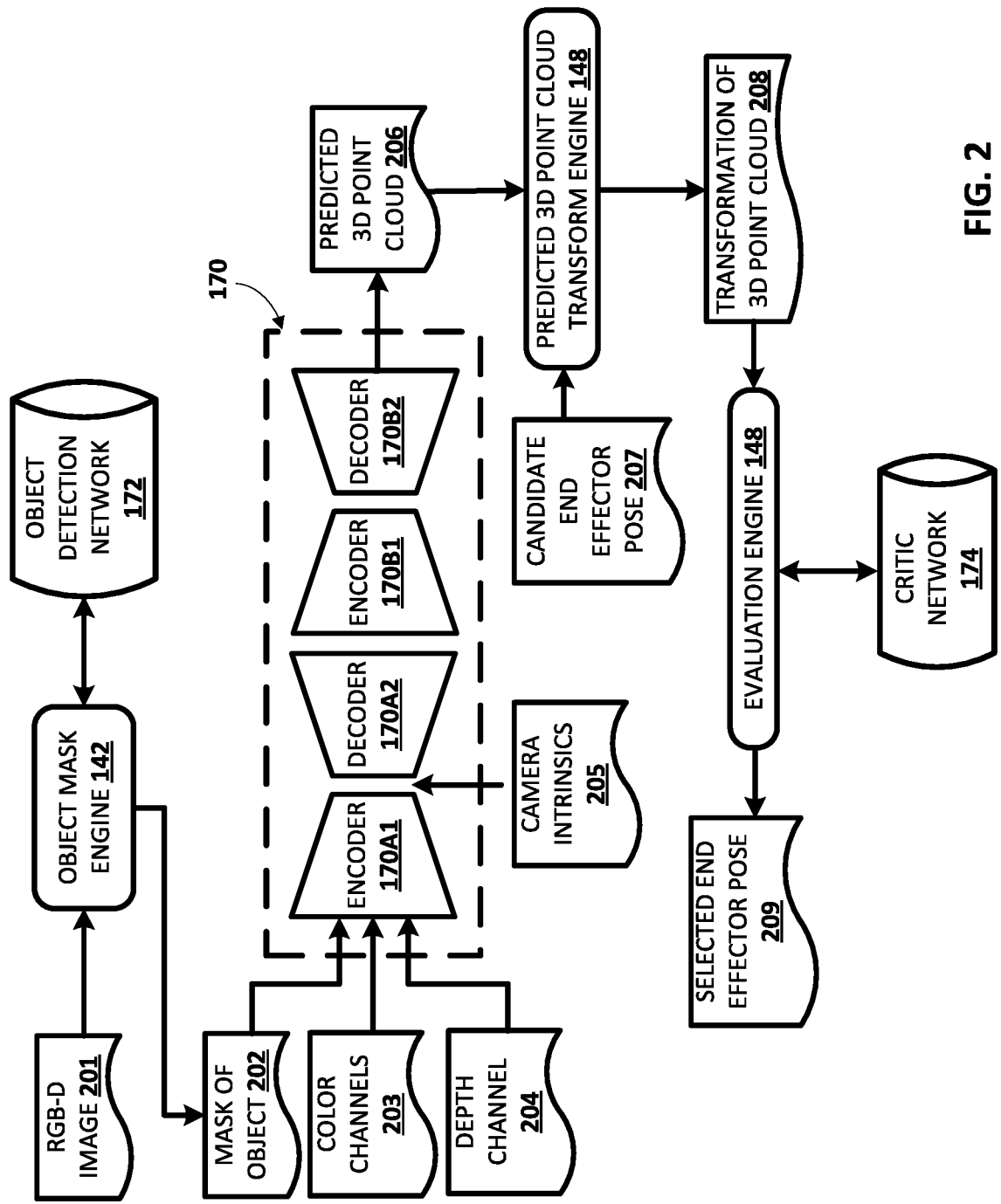
FIG. 2 illustrates an example of generating, using a trained point cloud prediction network and based on a RGB-D image captured by a robot, a predicted 3D point cloud.

Referring now to FIG. 2, an example is illustrated of generating, using the trained point cloud prediction network 170 and based on a RGB-D image 201 captured by a robot (e.g., robot 190 of FIG. 1), a predicted 3D point cloud 201. FIG. 2 further illustrates an example of using the predicted 3D point cloud 201 in controlling a robot. FIG. 2 can involve performing one or more (e.g., all) of the blocks of method 500 of FIG. 5.

In FIG. 2, the RGB-D image 201 is processed, by mask engine 142 using object detection network 172, to generate a mask of an object 202 that is captured by the RGB-D image 201. The mask of the object 202 is applied as initial input to the point cloud prediction network 170, along with color channels 203 and a depth channel 204 of the RGB-D image (e.g., at least those portions corresponding to a bounding box of the object, optionally determined by object mask engine 142). The illustrated example of the point cloud prediction network includes two pairs one encoder-decoders (170A1 and 170A2; and 170B1 and 170B2). It can also optionally include additional or alternative unillustrated layers. Camera intrinsics 205 can also optionally be applied as side input 205 as illustrated (e.g., after the encoder 170A1). The predicted 3D point cloud 206 is generated based on processing the inputs using the point cloud prediction network 170.

The predicted 3D point cloud transform engine 148 generates a transformation of the 3D point cloud 208, that is a transformation of the predicted 3D point cloud 206 based on a candidate end effector pose 207 being considered. The evaluation engine 148 can generate a prediction of successful manipulation based on processing the transformation of the 3D point cloud 208 using the critic network 174. The prediction of successful manipulation indicates a measure of successful manipulation if the candidate end effector pose 207, used to generate the transformation of the 3D point cloud 208, is utilized in attempting the manipulation. The evaluation engine 148 can generate a prediction of successful manipulation for each of multiple candidate end effector poses, based on processing corresponding transformations of the 3D point cloud. For example, the evaluation engine 148 can utilize the cross-entropy method (CEM) or other technique in sampling a plurality of candidate end effector poses 207, and can select the one with the best prediction of successful manipulation as the selected end effector pose 209. The selected end effector pose 209 can then be used to control actuators of the robot to cause an end effector of the robot to traverse to the selected end effector pose 209, and then a manipulation of the object attempted.

Figure 3A:
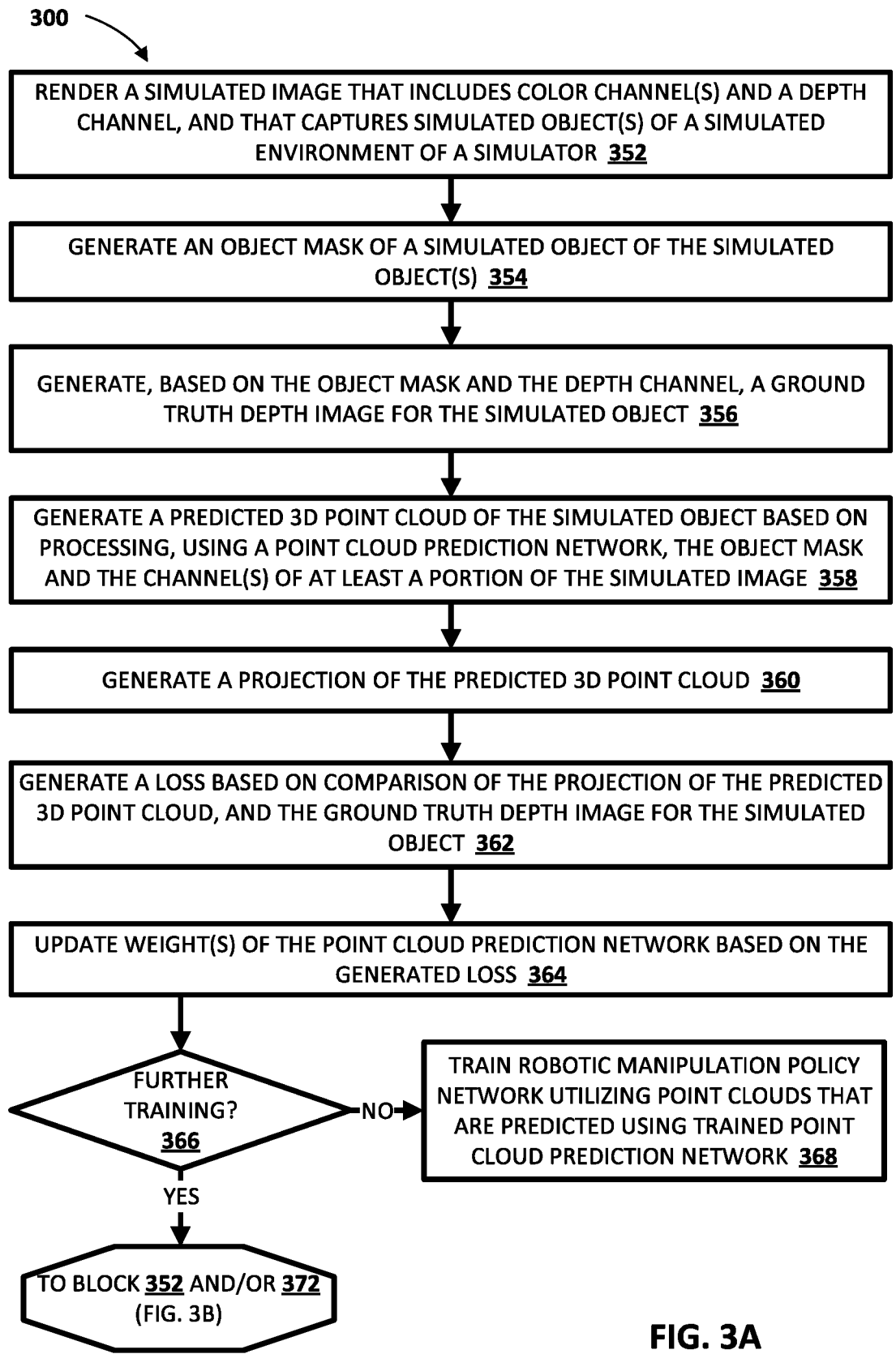
FIGS. 3A and 3B illustrate a flow chart of an example method of training a point cloud prediction network using simulated and real world data.
Figure 3B:
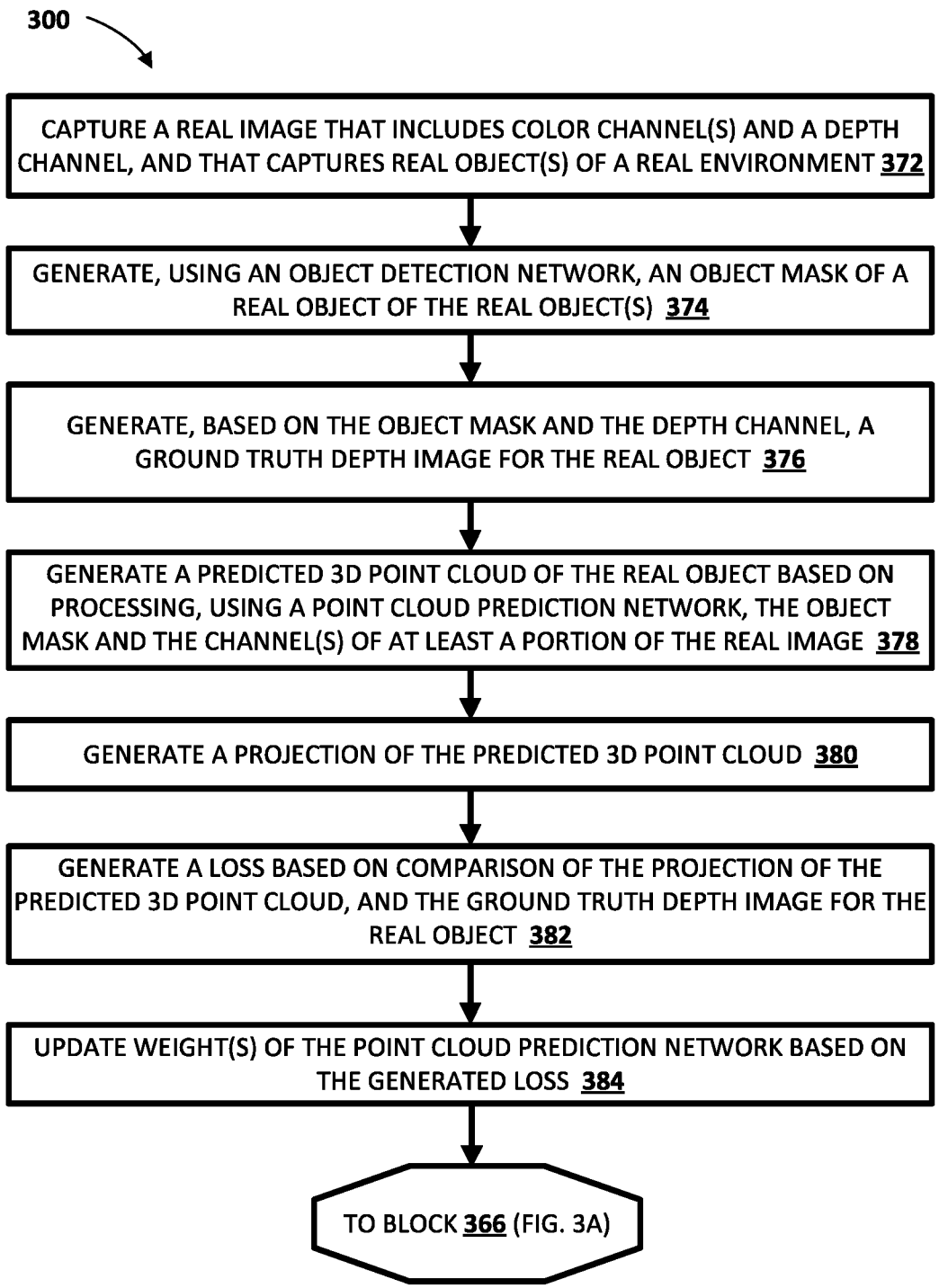

Referring now to FIGS. 3A and 3B, an example method 300 of training a point cloud prediction network using simulated and real world data is described. For convenience, the operations of the flowchart are described with reference to a system that performs the operations. This system may include various components of one or more computing devices, such as point cloud training system 140. Moreover, while operations of method 300 are shown in a particular order, this is not meant to be limiting. One or more operations may be reordered, omitted or added.

At block 352, the system renders a simulated image that includes color channel(s) and a depth channel, and that captures simulated object(s) of a simulated environment of a simulator.

At block 354, the system generates an object mask of a simulated object of the simulated object(s) captured by the simulated image. The system can also optionally generate a bounding box for the simulated object in the simulated image.

At block 356, the system generates, based on the object mask and the depth channel, a ground truth depth image for the simulated object.

At block 358, the system generates a predicted 3D point cloud of the simulated object based on processing, using a point cloud prediction network, the object mask and the channel(s) (e.g., including the color channel(s) and the depth channel) of at least a portion of the simulated image. For example, at least the portion of the simulated image that captures the simulated object can be processed. For instance, a cropped portion can be processed, where the crop corresponds to a bounding box of the simulated object. In some implementations, the system also processes camera intrinsics using the point cloud prediction network, in generating the predicted 3D point cloud.

At block 360, the system generates a projection of the predicted 3D point cloud of block 358.

At block 362, the system generates a loss based on comparison of the projection of the predicted 3D point cloud (block 360), and the ground truth depth image (block 356) for the simulated object. As noted herein, in various implementations the loss can be generated based on a batch of training instances (e.g., based on comparisons of multiple projections and ground truth depth images).

At block 364, the system updates weight(s) of the point cloud prediction network based on the generated loss.

At block 366, the system determines whether to perform further training of the point cloud prediction network. In some implementations, the system can determine whether to perform further training based on whether there are if any unprocessed training instances and/or if other training criteria is not yet satisfied. The other training criteria can include a threshold number of training epochs, a threshold duration of training time, and/or other criterion/criteria.

If, at an iteration of block 366, the system determines that further training is not needed for the point cloud prediction network, the system can consider the point cloud prediction network trained and can optionally proceed to block 368.

At block 368, the system can train a robotic manipulation policy network utilizing point clouds that are predicted using the trained point cloud prediction network. For example, the system can perform method 400 of FIG. 4 to train a critic network utilizing point clouds that are predicted using the trained point cloud prediction network.

If, at an iteration of block 366, the system determines that further training is needed, the system can return to block 352 or proceed to block 372 of FIG. 3B. FIG. 3B performs training of the point cloud prediction network based on real world data, whereas blocks of FIG. 3A performs training of the point cloud prediction network based on simulated data. In some implementations, the system can train the point cloud prediction network based solely on simulated data (not performing any blocks of FIG. 3B). In some implementations, the system can train the point cloud prediction network based mainly on simulated data, but can also train on some simulated data. In those implementations, the system can proceed to block 372, responsive to at least some of the yes determinations at block 366. For example the system can proceed to block 372 at least intermittently.

Referring now to FIG. 3B, at block 372, they system captures a real image that includes color channel(s) and a depth channel, and that captures real object(s) of a real environment. The system can also optionally generate a bounding box of the simulated object.

At block 374, the system generates, using an object detection network, an object mask of a real object of the real object(s). The system can also optionally generate a bounding box for the real object in the real image.

At block 376, the system generates, based on the object mask and the depth channel, a ground truth depth image for the real object.

At block 378, the system generates a predicted 3D point cloud of the real object based on processing, using a point cloud prediction network, the object mask and the channel(s) (e.g., including the color channel(s) and/or the depth channel) of at least a portion of the real image. For example, at least the portion of the real image that captures the real object can be processed. For instance, a cropped portion can be processed, where the crop corresponds to a bounding box of the real object. In some implementations, the system also processes camera intrinsics using the point cloud prediction network, in generating the predicted 3D point cloud.

At block 380, the system generates a projection of the predicted 3D point cloud of block 378.

At block 382, the system generates a loss based on comparison of the projection of the predicted 3D point cloud (380), and the ground truth depth image for the real object (376).

At block 384, the system updates weight(s) of the point cloud prediction network based on the generated loss, and the system returns to block 366 of FIG. 3A to determine whether any further training is needed for the point cloud prediction network. As noted herein, in various implementations the loss can be generated based on a batch of training instances (e.g., based on comparisons of multiple projections and ground truth depth images).

Figure 4:
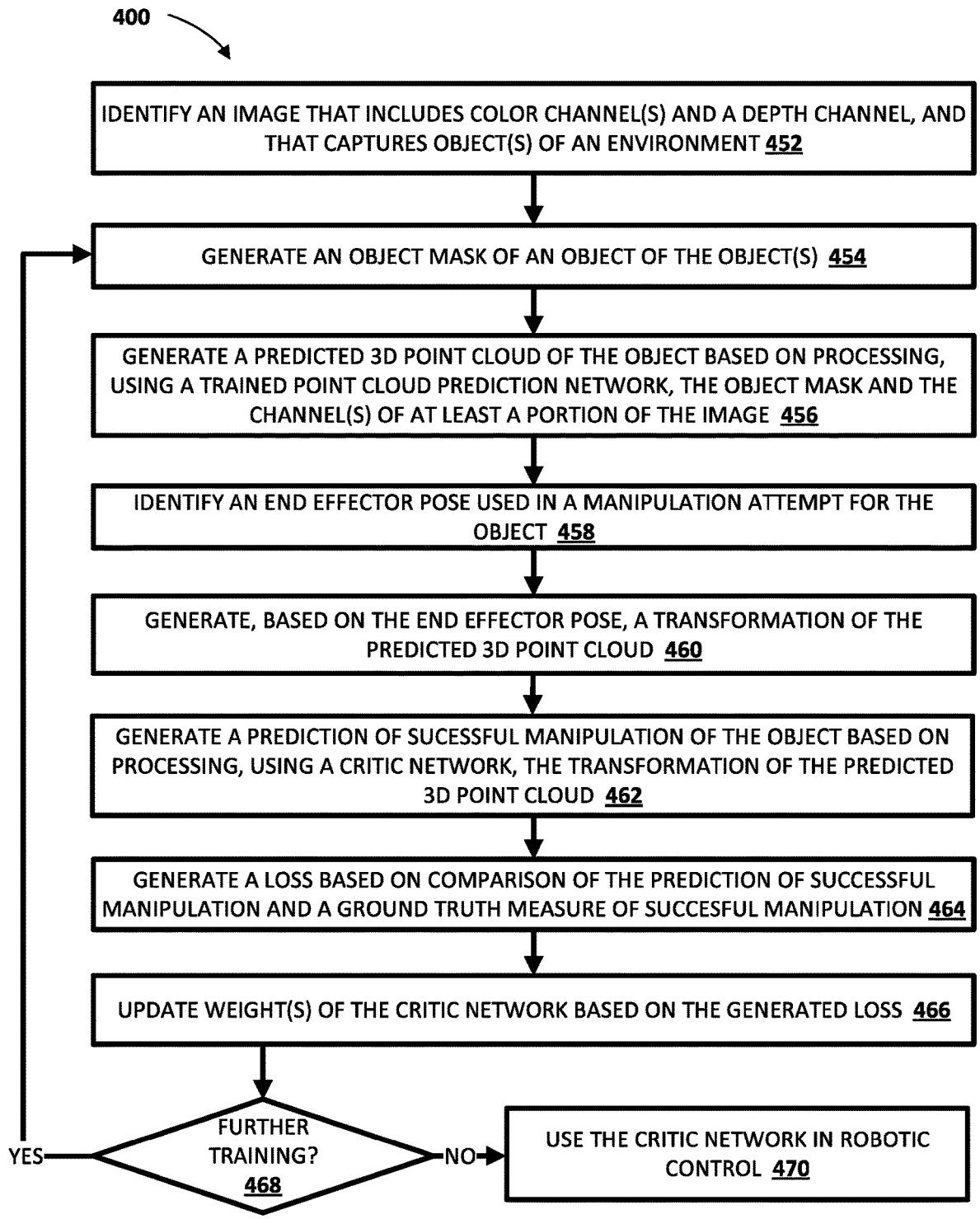
FIG. 4 illustrate a flow chart of an example method of training a critic network using predicted 3D point clouds.

Referring now to FIG. 4, an example method 400 of training a critic network using predicted 3D point clouds is described. For convenience, the operations of the flowchart are described with reference to a system that performs the operations. This system may include various components of one or more computing devices, such as critic training system 150. Moreover, while operations of method 400 are shown in a particular order, this is not meant to be limiting. One or more operations may be reordered, omitted or added.

At block 452, the system identifies an image that includes color channel(s) and a depth channel, and that captures object(s) of an environment. The image can be a real image and the environment a real environment, or the image can be a rendered simulated image and the environment a simulated environment.

At block 454, the system generates an object mask of an object of the object(s). The system can also optionally generate a bounding box for the object in the image.

At block 456, the system generates a predicted 3D point cloud of the object based on processing, using a trained point cloud prediction network, the object mask and the channel(s) (e.g., including the color channel(s) and/or the depth channel) of at least a portion of the image. For example, at least the portion of the image that captures the object can be processed. For instance, a cropped portion can be processed, where the crop corresponds to a bounding box of the object. In some implementations, the system also processes camera intrinsics using the point cloud prediction network, in generating the predicted 3D point cloud.

At block 458, the system identifies an end effector pose used in a manipulation attempt for the object. The manipulation attempt can be a real world manipulation attempt when the image is a real image, or can be a simulated manipulation attempt when the image is a simulated image.

At block 460, the system generates, based on the end effector pose, a transformation of the predicted 3D point cloud.

At block 462, the system generates a prediction of successful manipulation of the object based on processing, using a critic network, the transformation of the predicted 3D point cloud.

At block 464, the system generates a loss based on comparison of the prediction of successful manipulation and a ground truth measure of successful manipulation. The ground truth measure of successful manipulation is based on whether the manipulation attempt is successful. For example, success of a simulated manipulation attempt can be determined based on data from the simulator, following the manipulation attempt.

At block 466, the system updates weight(s) of the critic network based on the generated loss. As noted herein, in various implementations the loss can be generated based on a batch of training instances (e.g., based on comparisons of multiple predictions of successful manipulation and ground truth measures of successful manipulation).

At block 468, the system determines whether to perform further training of the critic network. In some implementations, the system can determine whether to perform further training based on whether there are if any unprocessed training instances and/or if other training criteria is not yet satisfied. The other training criteria can include a threshold number of training epochs, a threshold duration of training time, and/or other criterion/criteria.

If, at an iteration of block 468, the system determines to perform further training of the critic network, the system can return to block 454.

If, at an iteration of block 468, the system determines that further training is not needed for the critic network, the system can proceed to block 470.

At block 470, the system uses the critic network in robotic control. For example, the system can use the critic network in controlling a robot, based on method 500 of FIG. 5.

Figure 5:
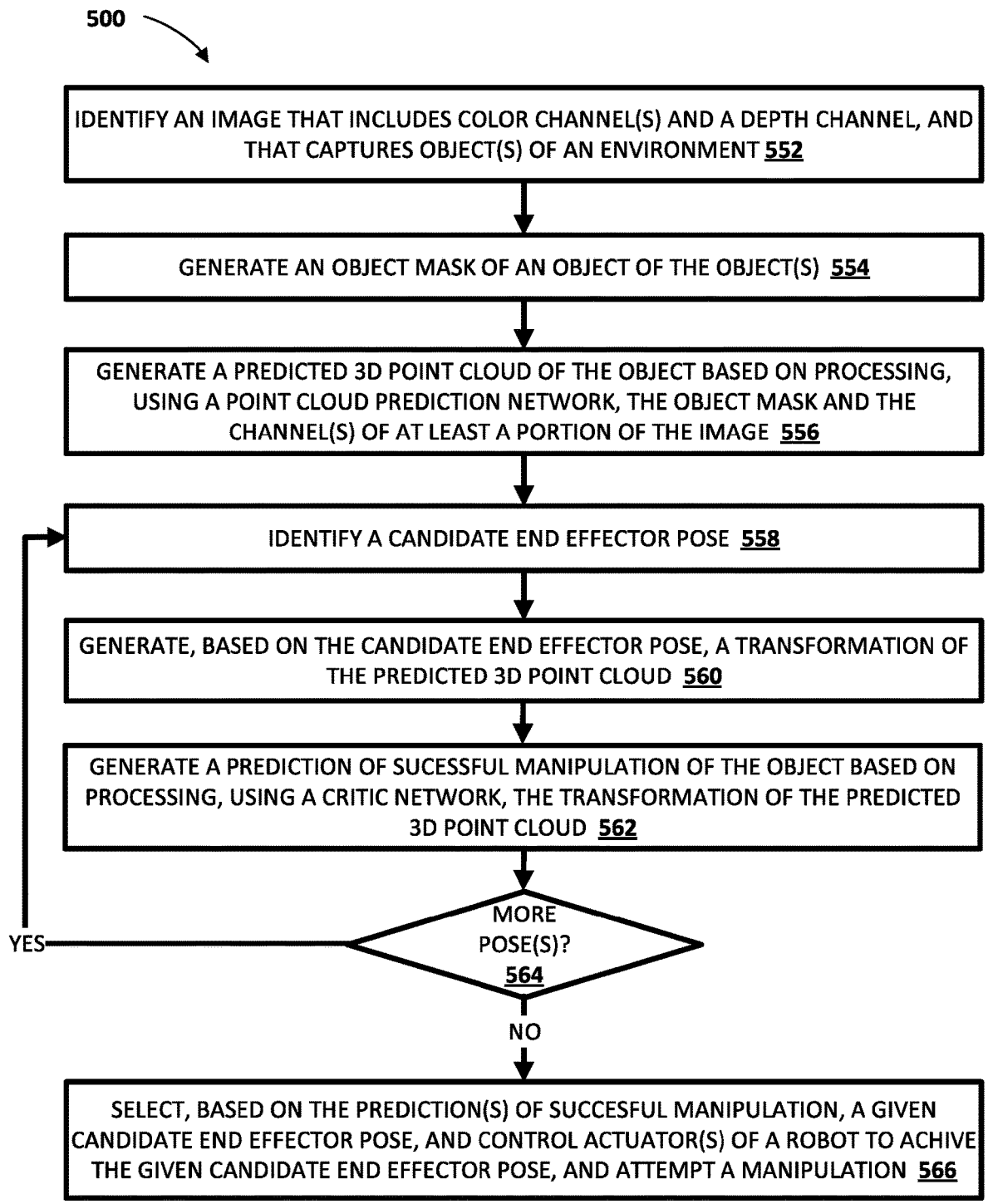
FIG. 5 illustrates a flow chart of an example method of using a trained critic network and predicted 3D point clouds in controlling a robot.

Referring now to FIG. 5, an example method 500 of using a trained critic network and predicted 3D point clouds in controlling a robot is described. For convenience, the operations of the flowchart are described with reference to a system that performs the operations. This system may include various components of a robot (e.g., robot 190 of FIG. 1, robot 600 of FIG. 6, and/or other robot(s)) and/or of one or more computing devices in communication with the robot (e.g., computing device 710 of FIG. 7). Moreover, while operations of method 500 are shown in a particular order, this is not meant to be limiting. One or more operations may be reordered, omitted or added.

At block 552, the system identifies an image that includes color channel(s) and a depth channel, and that captures object(s) of an environment. The image can be captured by, for example, an RGB-D camera of a robot.

At block 554, the system generates an object mask of an object of the object(s). The system can also optionally generate a bounding box for the object in the image.

At block 556, the system generates a predicted 3D point cloud of the object based on processing, using a point cloud prediction network, the object mask and the channel(s) (e.g., including the color channel(s) and/or the depth channel) of at least a portion of the image. For example, at least the portion of the image that captures the object can be processed. For instance, a cropped portion can be processed, where the crop corresponds to a bounding box of the object. In some implementations, the system also processes camera intrinsics using the point cloud prediction network, in generating the predicted 3D point cloud.

At block 558, the system identifies a candidate end effector pose.

At block 560, the system generates, based on the candidate end effector pose, a transformation of the predicted 3D point cloud.

At block 562, the system generates a prediction of successful manipulation of the object based on processing, using a critic network, the transformation of the predicted 3D point cloud.

At block 564, the system determines whether more candidate end effector pose(s) should be considered. For example, the system can utilize CEM or other technique to consider multiple end effector poses. For instance, in a first iteration of CEM N candidate end effector poses can be randomly sampled and considered then, in a next iteration of CEM, additional candidate end effector poses can be sampled from near the candidate end effector pose of the first iteration with the best prediction of successful grasp. Additional iterations of CEM can optionally be performed.

If, at an iteration of block 564, the system determines there are more candidate end effector pose(s), the system may return to block 558 to identify an additional candidate end effector pose.

If, at an iteration of block 564, the system determines there are no more candidate end effector pose(s), the system may proceed to block 566.

At block 566, the system selects, based on the prediction(s) of successful manipulation, a given candidate end effector pose, and control(s) actuator(s) of a robot to achieve the given candidate end effector pose (i.e., traverse an end effector thereto) and then attempt a manipulation of the object. The manipulation can be, for example, a grasp attempt, when the critic network is trained for grasp attempts.

Figure 6:
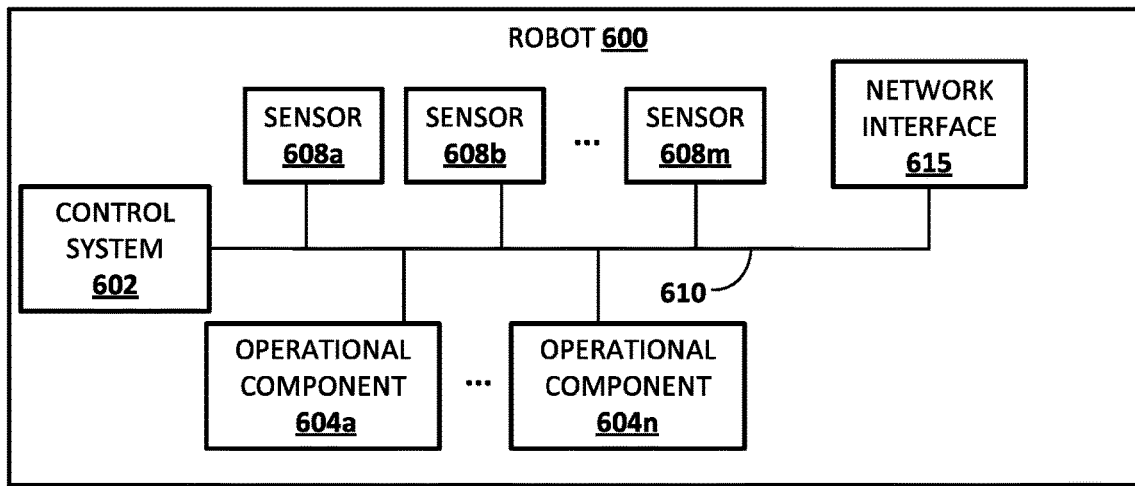
FIG. 6 schematically depicts an example architecture of a robot.

FIG. 6 schematically depicts an example architecture of a robot 600. Robot 190 of FIG. 1 may implement one or more components of the example architecture of FIG. 6. The robot 600 includes a robot control system 660, one or more operational components 604a-604n, and one or more sensors 608a-608m. The sensors 608a-608m may include, for example, vision sensors (e.g., camera(s), 3D scanners), light sensors, pressure sensors, pressure wave sensors (e.g., microphones), proximity sensors, accelerometers, gyroscopes, thermometers, barometers, and so forth. While sensors 608a-608m are depicted as being integral with robot 600, this is not meant to be limiting. In some implementations, sensors 608a-608m may be located external to robot 600, e.g., as standalone units.

Operational components 604a-604n may include, for example, one or more end effectors (e.g., grasping end effectors) and/or one or more servo motors or other actuators to effectuate movement of one or more components of the robot. For example, the robot 600 may have multiple degrees of freedom and each of the actuators may control actuation of the robot 600 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The control system 602 may be implemented in one or more processors, such as a CPU, GPU, and/or other controller(s) of the robot 600. In some implementations, the robot 600 may comprise a "brain box" that may include all or aspects of the control system 602. For example, the brain box may provide real time bursts of data to the operational components 604a-n, with each of the real time bursts comprising a set of one or more control commands that dictate, inter alia, the parameters of motion (if any) for each of one or more of the operational components 604a-n.

Although control system 602 is illustrated in FIG. 6 as an integral part of the robot 600, in some implementations, all or aspects of the control system 602 may be implemented in a component that is separate from, but in communication with, robot 600. For example, all or aspects of control system 602 may be implemented on one or more computing devices that are in wired and/or wireless communication with the robot 600, such as computing device 710. In some implementations all or aspects of the control commands generated by the control system in performing a robotic task can be based on an action selected based on utilization of a trained robotic manipulation policy model as described herein. For example, 2.5D vision data from a camera of the robot can be transformed to a domain-invariant 3D representation utilizing a shape prediction network, and the domain-invariant 3D representation processed utilizing a trained robotic manipulation policy model, in selecting the action.

Figure 7:
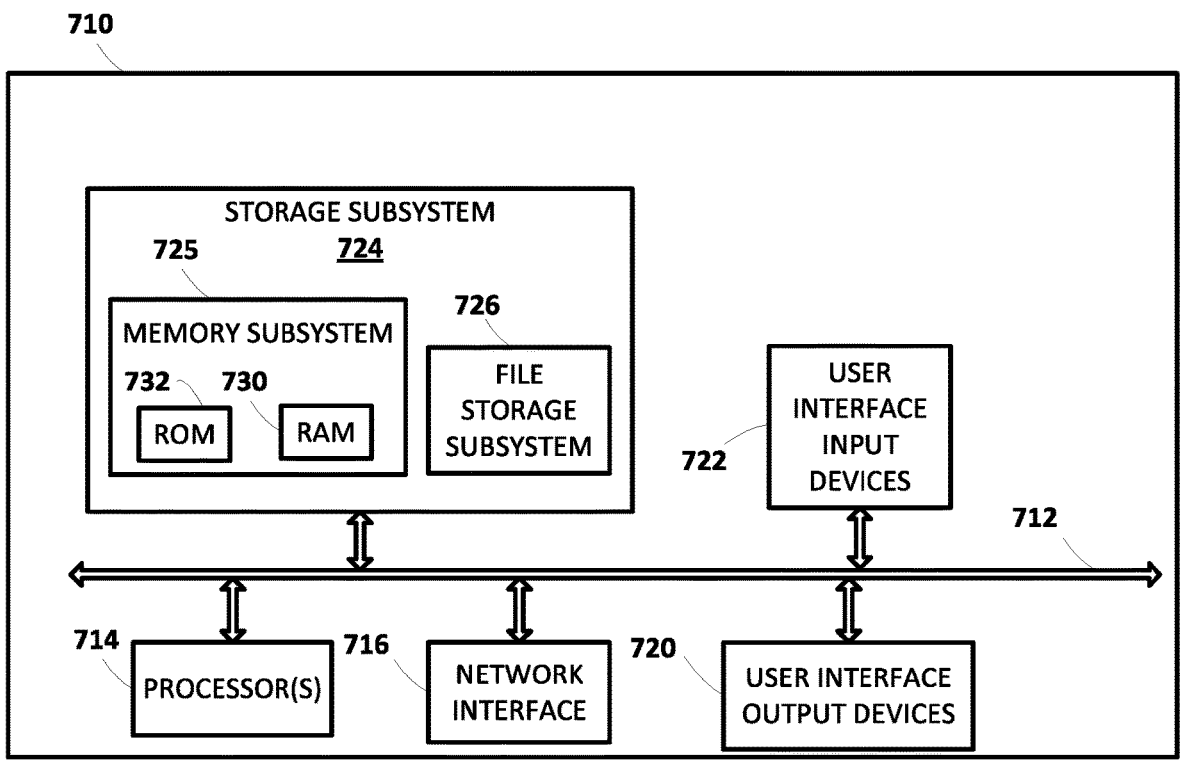
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors of a robot is provided and includes identifying a 2.5D image that is captured by a camera of the robot and that captures an object in an environment of the robot. The method further includes processing, using a shape prediction network, at least the 2.5D image to generate a domain-invariant 3D representation of the object. The method further includes processing the domain-invariant 3D representation of the object, or a transform of the domain-invariant 3D representation, utilizing a robotic manipulation policy network to determine an action to apply to the robot. The method further includes providing control commands to one or more actuators of the robot to cause performance of the action by the robot.

These and other implementations of the technology can include one or more of the following features.

In some implementations, the domain-invariant 3D representation of the object is a 3D point cloud of the object.

In some implementations, the method further includes processing the 2.5D image to generate a mask that indicates which pixels of the 2.5D image include the object. Those implementations further include processing the mask, along with the 2.5D image, in generating the domain-invariant 3D representation of the object utilizing the shape prediction network.

In some implementations, the method includes processing a transform of the domain-invariant 3D representation of the object, in determining the action utilizing the robotic manipulation policy network. In some versions of those implementations, the transform is generated by transforming, using the robotic end effector pose, the domain-invariant 3D representation to a frame of the robotic end effector. In some additional or alternative versions, the processing utilizing the robotic manipulation policy network generates a measure (e.g., probability) that the robotic end effector pose will lead to successful manipulation of the object. In some of those additional or alternative versions, determining the action includes determining to attempt the manipulation at the robotic end effector pose, based on the measure satisfying a threshold. The manipulation of the object can be, for example, a grasp of the object.

In some implementations, a method implemented by one or more processors of a robot is provided and includes identifying an image captured by a camera of a robot. The image captures an object to be manipulated by the robot, and the image includes multiple channels, including one or more color channels and a depth channel. The method further includes generating an object mask of the object to be manipulated by the robot. Generating the object mask can include processing one or more of the channels of the image using an object detection network. The method further includes generating a three-dimensional (3D) point cloud of the object. Generating the 3D point cloud of the object can include processing, using a point cloud prediction network: all of the channels of at least a portion of the image, and the generated object mask of the object. The method further includes using the generated 3D point cloud in controlling one or more actuators of the robot.

These and other implementations of the technology can include one or more of the following features.

In some implementations, the object detection network is trained for processing images to generate bounding boxes and masks of objects in the images. In some of those implementations, the method further includes generating a bounding box for the object to be manipulated by the robot. Generating the bounding box can include processing one or more of the channels of the image using the object detection network. In some versions of those implementations, the at least the portion of the image that is processed using the point cloud prediction network is a crop of the image selected based on the bounding box. For example, the method can further include selecting the crop of the image based on pixels of the image, included in the crop, being encompassed by the bounding box. In some versions where the at least the portion is a crop, generating the 3D point cloud of the object can further include processing, using the point cloud prediction network: one or more camera intrinsics that define one or more intrinsic parameters of the camera that take into account the crop of the image. In some of those versions, in processing the one or more camera intrinsics using the point cloud prediction network, the one or more camera intrinsics are applied, as side input to the point cloud prediction network, downstream from an initial input at which all of the channels of at least the portion of the image, and the generated object mask of the object are applied as initial input. For example, all of the channels of at least the portion of the image and the generated object mask of the object can be initially processed using an initial encoder of the point cloud prediction network, and the camera intrinsics can be applied as side input after the initial encoder and prior to processing using an initial decoder of the point cloud prediction network.

In some implementations, using the generated 3D point cloud in controlling the one or more actuators of the robot includes generating a prediction of successful manipulation of the object based on the 3D point cloud of the object, or a transformation of the 3D point cloud, and controlling the one or more actuators of the robot based on the prediction of successful manipulation. In some versions of those implementations, generating the prediction of successful manipulation of the object includes generating the prediction of successful manipulation by processing the generated 3D point cloud of the object, or the transformation of the 3D point cloud, using a critic network. In some of those versions, generating the prediction of successful manipulation includes: identifying a candidate end effector pose, of an end effector of the robot; generating the transformation of the 3D point cloud by transforming the 3D point cloud to an end effector frame that is relative to the end effector pose; and generating the prediction of successful manipulation by processing the transformation of the 3D point cloud using the critic network. Further, in some of those versions, controlling the one or more actuators of the robot based on the prediction of successful manipulation can include: selecting the candidate end effector pose based on the prediction of successful manipulation satisfying at least one criterion; and in response to selecting the candidate end effector pose: controlling the one or more actuators of the robot to cause the end effector to traverse to the candidate end effector pose. Optionally, the manipulation is grasping, and controlling the one or more actuators of the robot based on the prediction of successful manipulation further includes: causing the end effector to attempt a grasp of the object after the end effector is in the candidate end effector pose. Yet further, in some versions, the method further includes: identifying an additional candidate end effector pose of the end effector; generating an additional transformation of the 3D point cloud by transforming the 3D point cloud to an additional end effector frame that is relative to the additional end effector pose; and generating an additional prediction of successful manipulation by processing the additional transformation of the 3D point cloud using the critic network. The at least one criterion utilized in selecting the candidate end effector pose based on the prediction of successful manipulation can include the prediction of successful manipulation being more indicative of success than the additional prediction of successful manipulation.

In some implementations, the point cloud prediction network comprises a plurality of encoder-decoder modules, and at least one fully-connected layer.

In some implementations a method of training a point cloud prediction network is provided and is implemented by one or more processor. The method includes rendering a simulated image of a simulated environment of a simulator. The simulated image captures at least one simulated object of the simulated environment, and the simulated image includes multiple channels, including one or more color channels and a depth channel. The method further includes generating an object mask of the simulated object, and generating a ground truth depth image for the object based on the object mask and the depth channel of the simulated image. The method further includes generating a predicted three-dimensional (3D) point cloud of the simulated object. Generating the predicted 3D point cloud of the simulated object includes processing, using a point cloud prediction network: all of the channels of at least a portion of the image, and the generated object mask of the simulated object. The method further includes generating a projection of the predicted 3D point cloud. The projection is a predicted depth image for the simulated object that is based on the predicted 3D point cloud. The method further includes generating a loss based at least in part on comparison of: the projection of the predicted 3D point cloud, and the ground truth depth image of the simulated object. The method further includes updating one or more weights of the point cloud prediction network based at least in part on the generated loss.

These and other implementations of the technology can include one or more of the following features.

In various implementations, using comparison of the projection and the ground truth depth image in determining the loss provides one or more advantages. For example, training on such a loss in simulation can mitigate the reality gap of the point cloud prediction network relative to, for example, instead utilizing comparison of the predicted 3D point cloud itself to a ground truth 3D point cloud (obtained directly from simulation). Also, for example, such a loss can also be efficiently utilized in training the point cloud prediction network based on real-world data. For instance, the real-world ground truth depth image can be efficiently generated. On the other hand, ground-truth 3D point cloud data in the real world can be time-consuming and/or computationally expensive to obtain.

In some implementations, generating the projection of the 3D point cloud includes using intrinsic parameters, of a simulated camera utilized to render the simulated image, to generate the projection of the predicted 3D point cloud.

In some implementations, the method further includes determining a bounding box for the simulated object. In some of those implementations, the at least the portion of the image that is processed using the point cloud prediction network is a crop of the image selected based on the bounding box. For example, the crop of the image can be selected based on pixels of the image, included in the crop, being encompassed by the bounding box.

In some implementations, the method further includes capturing a real image of a real environment. The real image captures at least one real object, and the real image includes multiple channels, including one or more color channels and a depth channel. In those implementations, the method further includes generating an additional object mask of the real object. Generating the additional object mask includes processing one or more of the channels of the real image using an object detection network. In those implementations, the method further includes: generating an additional ground truth depth image for the real object based on the additional object mask and the depth channel of the real image; and generating an additional predicted three-dimensional (3D) point cloud of the real object. Generating the additional predicted 3D point cloud of the real object includes processing, using a point cloud prediction network: all of the channels of at least a portion of the real image, and the generated object mask of the real object. In those implementations, the method further includes: generating an additional projection of the additional predicted 3D point cloud; generating an additional loss based at least in part on comparison of: the projection of the additional predicted 3D point cloud, and the additional ground truth depth image of the real object; and updating one or more weights of the point cloud prediction network based at least in part on the generated updated loss.

In some implementations, the method further includes determining the training of the point cloud prediction network satisfies one or more criteria. The one or more criteria can include, for example, a threshold quantity of training epochs, a threshold duration of training, convergence of training, evaluation indicting at least a threshold level of accuracy and/or robustness, and/or one or more of other criteria. The method can further includes, in response to determining the training of the point cloud prediction network satisfies the one or more criteria: training a critic network utilizing addition point clouds that are predicted using the trained point cloud prediction network.

Various implementations disclosed herein can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations may include a system of one or more computers and/or one or more robots that include one or more processors operable to execute stored instructions to perform a method such as one or more of the methods described herein.

What is claimed is:

1. A method implemented by one or more processors of a robot, the method comprising:
   identifying an image captured by a camera of the robot, the image capturing an object to be manipulated by the robot, and the image comprising multiple channels, including one or more color channels and a depth channel;
   generating an object mask of the object to be manipulated by the robot, wherein generating the object mask comprises:
      processing one or more of the channels of the image using an object detection network;
   generating a three-dimensional (3D) point cloud of the object, wherein generating the 3D point cloud of the object comprises:
      processing, using a point cloud prediction network:
         all of the channels of at least a portion of the image, and
         the generated object mask of the object;
   generating a prediction of successful manipulation of the object, wherein generating the prediction of successful manipulation of the object comprises:
      generating the prediction of successful manipulation by processing a transformation of the 3D point cloud, using a robotic manipulation policy model,
   wherein generating the prediction of successful manipulation comprises:
      sampling, from multiple candidate end effector poses, a candidate end effector pose, of an end effector of the robot,
      generating the transformation of the 3D point cloud by transforming the 3D point cloud to an end effector frame that is relative to the candidate end effector pose, and
      generating the prediction of successful manipulation by processing the transformation of the 3D point cloud using the robotic manipulation policy model; and
   controlling one or more actuators of the robot based on the prediction of successful manipulation.

2. The method of claim 1, wherein the object detection network is trained for processing images to generate bounding boxes and masks of objects in the images, and further comprising:
   generating a bounding box for the object to be manipulated by the robot, wherein generating the bounding box comprises:
      processing one or more of the channels of the image using the object detection network.

3. The method of claim 2, wherein the at least the portion of the image that is processed using the point cloud prediction network is a crop of the image selected based on the bounding box.

4. The method of claim 3, further comprising selecting the crop of the image based on pixels of the image, included in the crop, being encompassed by the bounding box.

5. The method of claim 3, wherein generating the 3D point cloud of the object further comprises:
   processing, using the point cloud prediction network:
      one or more camera intrinsics, the one or more camera intrinsics defining one or more intrinsic parameters of the camera that take into account the crop of the image.

6. The method of claim 5, wherein in processing the one or more camera intrinsics using the point cloud prediction network, the one or more camera intrinsics are applied, as side input to the point cloud prediction network, downstream from an initial input at which all of the channels of at least the portion of the image, and the generated object mask of the object are applied as initial input.

7. The method of claim 6, wherein all of the channels of at least the portion of the image and the generated object mask of the object are initially processed using an initial encoder of the point cloud prediction network, and wherein the camera intrinsics are applied as side input after the initial encoder and prior to processing using an initial decoder of the point cloud prediction network.

8. The method of claim 1, wherein controlling the one or more actuators of the robot based on the prediction of successful manipulation comprises:
selecting the candidate end effector pose based on the prediction of successful manipulation satisfying at least one criterion; and
in response to selecting the candidate end effector pose:
controlling the one or more actuators of the robot to cause the end effector to traverse to the candidate end effector pose.

9. The method of claim 8, wherein the manipulation is grasping, and wherein controlling the one or more actuators of the robot based on the prediction of successful manipulation further comprises:
causing the end effector to attempt a grasp of the object after the end effector is in the candidate end effector pose.

10. The method of claim 8, further comprising:
sampling, from the multiple candidate end effector poses, an additional candidate end effector pose of the end effector;
generating an additional transformation of the 3D point cloud by transforming the 3D point cloud to an additional end effector frame that is relative to the additional candidate end effector pose; and
generating an additional prediction of successful manipulation by processing the additional transformation of the 3D point cloud using the critic network;
wherein the at least one criterion utilized in selecting the candidate end effector pose based on the prediction of successful manipulation comprises the prediction of successful manipulation being more indicative of success than the additional prediction of successful manipulation.

11. The method of claim 1, wherein the point cloud prediction network comprises a plurality of encoder-decoder modules, and at least one fully-connected layer.

12. A system comprising:
one or more actuators operably coupled to a robot;
one or more processors; and
a memory, the memory comprising computer readable instructions that, when executed by the one or more processor, cause the system to perform a method comprising:
identifying an image captured by a camera of the robot, the image capturing an object to be manipulated by the robot, and the image comprising multiple channels, including one or more color channels and a depth channel;
generating an object mask of the object to be manipulated by the robot, wherein generating the object mask comprises:
processing one or more of the channels of the image using an object detection network;
generating a three-dimensional (3D) point cloud of the object, wherein generating the 3D point cloud of the object comprises:
processing, using a point cloud prediction network:
all of the channels of at least a portion of the image, and
the generated object mask of the object;
generating a prediction of successful manipulation of the object, wherein generating the prediction of successful manipulation of the object comprises:
generating the prediction of successful manipulation by processing a transformation of the 3D point cloud, using a robotic manipulation policy model,
wherein generating the prediction of successful manipulation comprises:
sampling, from multiple candidate end effector poses, a candidate end effector pose, of an end effector of the robot,
generating the transformation of the 3D point cloud by transforming the 3D point cloud to an end effector frame that is relative to the candidate end effector pose, and
generating the prediction of successful manipulation by processing the transformation of the 3D point cloud using the robotic manipulation policy model; and
controlling the one or more actuators of the robot based on the prediction of successful manipulation.

13. The system of claim 12, wherein the object detection network is trained for processing images to generate bounding boxes and masks of objects in the images, and the method further comprises:
generating a bounding box for the object to be manipulated by the robot, wherein generating the bounding box comprises:
processing one or more of the channels of the image using the object detection network.

14. The system of claim 13,
wherein the at least the portion of the image that is processed using the point cloud prediction network is a crop of the image selected based on the bounding box; and
wherein generating the 3D point cloud of the object further comprises:
processing, using the point cloud prediction network:
one or more camera intrinsics, the one or more camera intrinsics defining one or more intrinsic parameters of the camera that take into account the crop of the image.

15. The system of claim 14, wherein in processing the one or more camera intrinsics using the point cloud prediction network, the one or more camera intrinsics are applied, as side input to the point cloud prediction network, downstream from an initial input at which all of the channels of at least the portion of the image, and the generated object mask of the object are applied as initial input.

16. The system of claim 15, wherein all of the channels of at least the portion of the image and the generated object mask of the object are initially processed using an initial encoder of the point cloud prediction network, and wherein the camera intrinsics are applied as side input after the initial encoder and prior to processing using an initial decoder of the point cloud prediction network.

17. The method of claim 1, wherein controlling the one or more actuators of the robot is based on the prediction of successful manipulation and is based on an additional prediction of successful manipulation of the object, and further comprising:
generating the additional prediction of successful manipulation of the object, wherein generating the additional prediction of successful manipulation of the object comprises:
generating the additional prediction of successful manipulation by processing an additional transformation of the 3D point cloud, using the robotic manipulation policy model, wherein generating the additional prediction of successful manipulation comprises:

sampling an additional candidate end effector pose, of the multiple candidate end effector poses of the end effector of the robot, generating the additional transformation of the 3D point cloud by transforming the 3D point cloud to an additional end effector frame that is relative to the additional candidate end effector pose, and generating the additional prediction of successful manipulation by processing the additional transformation of the 3D point cloud using the robotic manipulation policy model.

18. The system of claim 12, wherein controlling the one or more actuators of the robot is based on the prediction of successful manipulation and is based on an additional prediction of successful manipulation of the object, and wherein the method, performed by the system when the computer readable instructions are executed by the one or more processors, further comprises:

generating the additional prediction of successful manipulation of the object, wherein generating the additional prediction of successful manipulation of the object comprises:

generating the additional prediction of successful manipulation by processing an additional transformation of the 3D point cloud, using the robotic manipulation policy model, wherein generating the additional prediction of successful manipulation comprises:

sampling an additional candidate end effector pose, of the multiple candidate end effector poses of the end effector of the robot, generating the additional transformation of the 3D point cloud by transforming the 3D point cloud to an additional end effector frame that is relative to the additional candidate end effector pose, and generating the additional prediction of successful manipulation by processing the additional transformation of the 3D point cloud using the robotic manipulation policy model.

* * * * *